United States Patent
Gong et al.

(10) Patent No.: US 7,451,082 B2
(45) Date of Patent: Nov. 11, 2008

(54) NOISE-RESISTANT UTTERANCE DETECTOR

(75) Inventors: Yifan Gong, Plano, TX (US); Alexis P. Bernard, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 779 days.

(21) Appl. No.: 10/649,270

(22) Filed: Aug. 27, 2003

(65) Prior Publication Data

US 2005/0049863 A1 Mar. 3, 2005

(51) Int. Cl.
G10L 15/20 (2006.01)

(52) U.S. Cl. .................. 704/233; 704/226; 704/219; 704/210; 704/249

(58) Field of Classification Search .......... 704/226, 704/240, 210, 233, 268, 219; 179/1; 381/94.1
See application file for complete search history.

(56) References Cited

U.S. PATENT DOCUMENTS

| | | | | |
|---|---|---|---|---|
| 3,603,738 A | * | 9/1971 | Focht | 704/207 |
| 5,822,732 A | * | 10/1998 | Tasaki | 704/268 |
| 6,098,036 A | * | 8/2000 | Zinser et al. | 704/219 |
| 6,175,634 B1 | * | 1/2001 | Graumann | 381/94.1 |
| 6,473,735 B1 | * | 10/2002 | Wu et al. | 704/240 |
| 6,980,950 B1 | * | 12/2005 | Gong et al. | 704/210 |
| 2001/0001853 A1 | * | 5/2001 | Mauro et al. | 704/233 |

OTHER PUBLICATIONS

J. Markel, "Digital Inverse Filtering-A New Tool for Formant Trajectory Estimation," IEEE Transactions on Audio and Electroacoustics, vol. 20, Issue 2, pp. 129-137, Jun. 1972.*

* cited by examiner

*Primary Examiner*—Vijay B Chawan
(74) *Attorney, Agent, or Firm*—Wade J. Brady, III; Frederick J. Telecky, Jr.

(57) ABSTRACT

A method and detector for providing a noise resistant utterance detector is provided by extracting a noise estimate (15) to augment the signal-to-noise ratio of the speech signal, inverse filtering (17) of the speech signal to focus on the periodic excitation part of the signal and spectral reshaping (19) to accentuate separation between formants.

12 Claims, 2 Drawing Sheets

NOISE-RESISTANT UTTERANCE DETECTOR

FIELD OF INVENTION

This invention relates to noise-resistant utterance detector and more particularly to data processing for such a detector.

BACKGROUND OF INVENTION

Typical speech recognizers require at the input thereof an utterance detector 11 to indicate where to start and to stop the recognition of the incoming speech stream. See FIG. 1. Most utterance detectors use signal energy as the basic speech indicator.

In applications such as hands-free speech recognition in a car driven on a highway, the signal-to-noise ratio is typically around 0 dB. That means that the energy of the noise is about the same as that of the signal. Obviously, while speech energy gives good results for clean to moderately noisy speech, it is not adequate for reliable detection under such a noisy condition.

SUMMARY OF INVENTION

In accordance with one embodiment of the present invention a solution for performing endpoint detection of speech signals in the presence of background noise includes noise adaptive spectral extraction.

In accordance with another embodiment of the present invention a solution for performing endpoint detection of speech signals in the presence of background noise includes noise adaptive spectral extraction and inverse filtering.

In accordance with another preferred embodiment of the present invention a solution for performing endpoint detection of speech signals in the presence of background noise includes noise adaptive spectral extraction and inverse filtering and spectral reshaping.

DESCRIPTION OF PREFERRED EMBODIMENTS

Frame-Level Speech Detection

Speech/non-speech Decision Parameter

Figure 1:
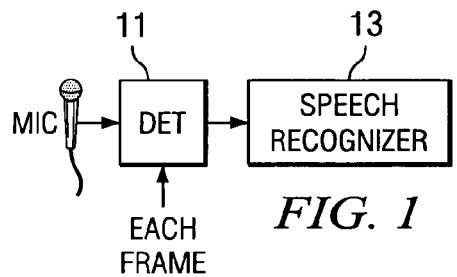
FIG. 1 illustrates an utterance detector for determining speech.

In speech utterance detection, two components are identified. The first component 11 makes a speech/non-speech decision for each incoming speech frame as illustrated in FIG. 1. The decision is based on a parameter indicating the likelihood of the current frame being speech. The second component 13 makes utterance detection decision, using some sort of decision logic that describes the detection process based on the speech/non-speech parameter made by the first component and on a priori knowledge on durational constraints. Such constraints may include the minimum number of frames to declare a speech segment, and the minimum number of frames to end a speech segment. The present patent deals with the first component.

Figure 2:
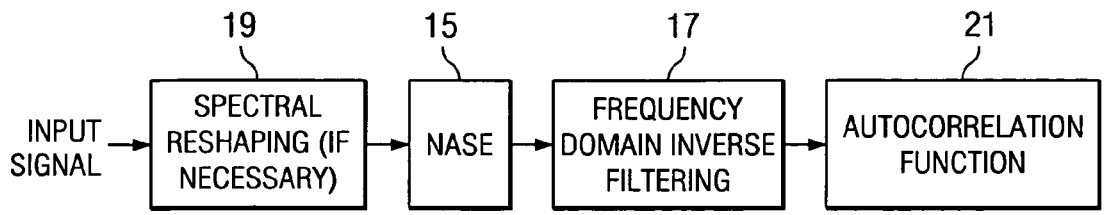
FIG. 2 is a block diagram of the system in accordance with a preferred embodiment of the present invention.

A preferred embodiment of the present invention provides speech utterance detection by noise-adaptive spectrum extraction (NASE) 15, frequency-domain inverse filtering 17, and spectrum reshaping 19 before autocorrelation 21 as illustrated by the block diagram of FIG. 2.

Autocorrelation Function

For resistance to noise, the periodicity, rather than energy, of the speech signal is used. Specifically, an autocorrelation function is used. The autocorrelation function used is derived from speech X(t), and is defined as:

$$R_x(\tau) = E[X(t)X(t+\tau)] \quad (1)$$

where X(t) is the observed speech signal at time t.
Important properties of $R_x(\tau)$ include:
If X(t+T)=X(t), then $$R_x(\tau+T) = R_x(\tau) \quad (2)$$

which means that, for periodical signal, the autocorrelation function is also periodical. This property gives one an indicator of speech periodicity.

If S(t) and N(t) are independent and both ergodic with zero mean, then for X(t)=S(t)+N(t):

$$R_x(\tau) = R_s(\tau) + R_N(\tau) \quad (3)$$

Most random noise signals are not correlated, i.e. they satisfy $$\lim_{\tau \to \infty} R_N(\tau) = 0$$

Therefore, we have, for large $\tau$:

$$R_X(\tau) \approx R_S(\tau) \quad (5)$$

This property says that autocorrelation function has some noise immunity.

Search for Periodicity

As speech signal typically contains periodical waveform, periodicity can be used as an indication of presence of speech. The periodicity measurement is defined as:

$$\rho = \max_{T_l}^{T_h} Rx^{(\tau)} \quad (6)$$

$T_l$ and $T_h$ are pre-specified so that the period found would range from 75 HZ to 400 Hz. A larger value of p indicates a high energy level at the time index where p is found. According to the present invention it is decided that the signal is speech if $\rho$ is larger than a threshold. The threshold is set to be larger than typical values of Rx(t) for non-speech frames.

Noise-adaptive Spectrum Extraction (NASE)

Outline

Applicants teach to use $\rho$ as the parameter for speech/non-speech decision in an utterance detector. For adequate performance, the input to the autocorrelation function, X(t), must be enhanced. Such enhancement can be achieved in the power-spectral representation of X(t), using the proposed noise-adaptive pre-processing.

Figure 3:
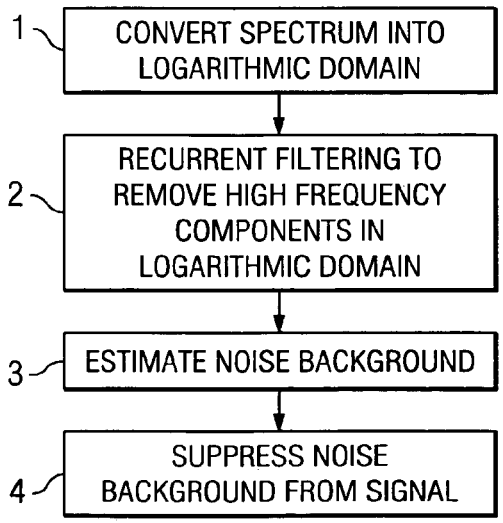
FIG. 3 illustrates the steps for noise-adaptive spectrum extraction in accordance with one embodiment of the present invention.

The input is the power spectrum of noisy speech (pds_signal[]) and the output is the power spectrum of clean speech in the same memory space. The following steps illustrated in FIG. 3 are performed:

Step 1. Convert the spectrum into logarithmic domain.
Step 2. Remove high frequency components in logarithmic domain by recurrent filtering.
Step 3. Establish an estimate of noise background.
Step 4. Suppress the noise background from the signal, in linear domain.

Detailed Description

Sequence A consists of initialization stage. Sequence B consists of the main processing block to be applied to every frame of the input signal.

For sequence A, noise-adaptive processing initialization:
γ=0.5
γMIN=0.0625
θ=0.98
η=0.37
α=30
β=0.016
frm_count=0
freq_nbr=256.

For sequence B, noise adaptive processing main section:

```
For i=0 freq_nbr do
    log_sig = log₁₀ (pds_signal[i]);
    past_sm[i]= (1- γ) * past_sm[i] + log_sig * γ
    tc = if past_sm[i] >past_ns[i]then θ else η fi
    past_ns [i] = (1-tc) * past_sm [i] + tc * past_ns [i]
    diff = pds_signal [i] - α * 10 ^ past_ns [i]
    pds_refe = β * pds_signal [i];
    pds_signal [i] = if (diff < pds_refe) then pds_refe elsediff fi
end
frm_count = frm_count + 1
if frm_count=10, THEN γ= γ_MIN fi.
```

Spectral Inverse Filtering

Outline

The production of speech sounds by humans is dictated by the source/vocal tract principle. The speech signal s(n) is thought to be produced by the source signal u(n) (larynx through the vocal cords) modulated by the vocal tract filter h(n) which resonates at some characteristic formant frequencies. In other words, the speech spectrum S(ω) is the result of the multiplication (convolution in the time domain) of the excitation spectrum U(ω) by the vocal tract transfer function H(ω)

$$S(\omega)=U(\omega)\times H(\omega) \quad (7)$$

For many speech applications, it is important to apply the inverse vocal tract filtering operation to perform analysis on the excitation signal u(n).

Since equation 6 focuses on the periodicity in the range of the excitation signal only and not on the periodicity induced by the formant frequency, inverse filtering the speech signal to restitute a good approximation of the unmodulated speech signal improves the endpoint detection performance.

Detailed Description

Typically, the vocal tract filter is estimated using linear prediction techniques. The coefficients $\alpha_k$ of the auto-regressive prediction filter $$H(z) = \frac{1}{1 - \sum_{k=1}^{P} \alpha_k z^{-k}} \quad (8)$$

are computed by minimizing the mean-square error of the prediction error.

In the present application, instead of basing the inverse filtering operation on the often used Linear Prediction (LP) filter, applicants teach to perform inverse filtering operation based on normalized approximation of the envelope of the short term speech spectrum derived from the local maxima of the short term speech spectrum. The advantage is that applicants avoid computation of LP coefficients and its corresponding spectrum. Selecting local maxima in the short term spectrum is an extremely simple task, especially considering the low resolution of the short term spectrum (128 frequency points). Note that since we never operate in the time-domain to find an estimate of the vocal tract filter, the inverse filtering in itself is performed in the log frequency domain (dB) and is implemented by simply removing (subtracting) from the original spectrum the estimated inverse filtering spectrum.

Figure 4:
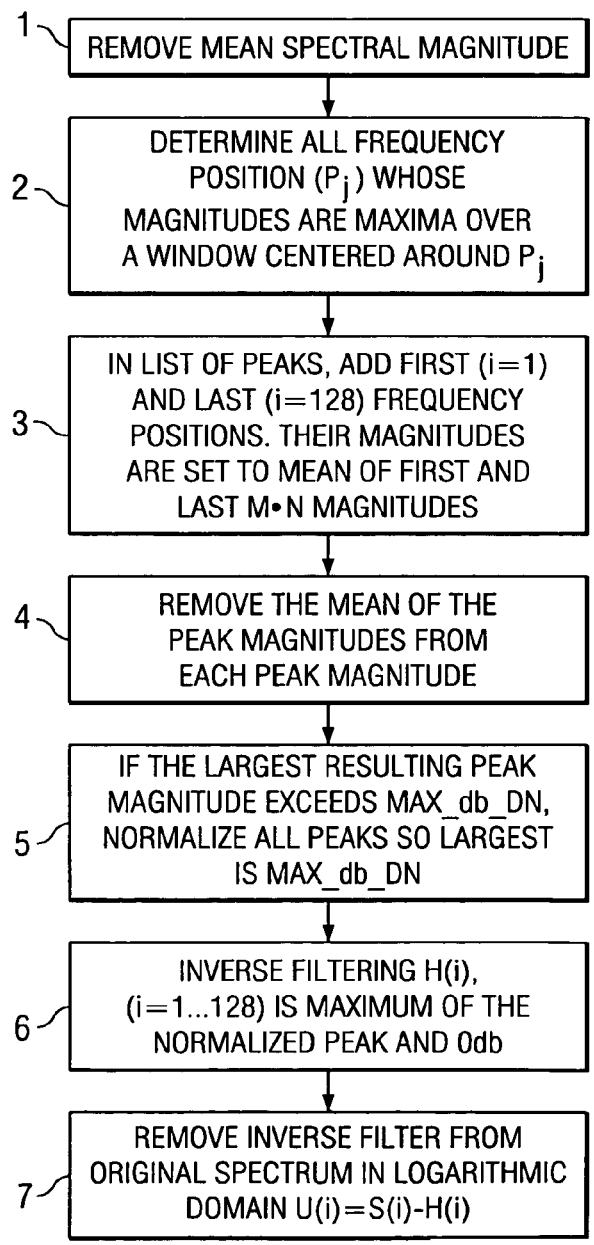
FIG. 4 illustrates the steps for determination of the inverse filter by use of the spectrum maxima and the inverse filtering operation.

Determination of the inverse filter by use of the spectrum maxima and the inverse filtering operation is performed by the steps in FIG. 4 and is as follows:

1. In the logarithmic (dB) domain, remove the mean spectral magnitude from the original speech spectrum.
2. In the mean removed short term frequency spectrum S(i), (i=1 . . . 128), determine all the frequency position ($p_j$) whose magnitudes are maxima over a window centered around $p_j$ and stretching N positions to the left and right of $p_j$.
3. In the list of peaks, add the first (i=1) and last (i=128) frequency positions Their associated magnitudes are set equal to the mean of the first and last M×N magnitudes, respectively.
4. Remove the mean of the peak magnitudes from each peak magnitude.
5. If the largest resulting peak magnitude exceeds MAX_dB_DN, normalize all peaks so that the largest peaks magnitude becomes MAX_dB_DN.
6. The resulting inverse filtering H(i), (i=1 . . . 128) is defined as the maximum of the normalized peaks and 0 dB.
7. Remove the inverse filter from the original spectrum in the logarithmic domain U(i)=S(i)−H(i).

In applicant's preferred embodiment, applicants used the following parameter values: N=3, MAX_dB_DN=3.5 dB, and M=5.

Spectral Shaping

Outline

The spectral reshaping technique allows for the inverse filtering technique based on the envelope of the maxima to operate properly even when the first two formants in the speech signal are close together, such as in the /u/ or /ow/ sound. Indeed, in this case the formants being so close, there is no valley in the spectrum being determined between the maxima of the formant frequencies and the envelope spectrum resembles a large dome in the low frequency domain. The consequence of this is that the entire low-frequency spectrum is exceedingly inverse filtered and it is difficult to notice the voicing of the excitation in the resulting spectrum. The solution is to implement a detector at the input in the spectrum re-shaper 19 (see FIG. 2) which operates on the noise-extracted speech spectrum and raises a flag when it detects two low-frequency formants close together. When this occurrence is found, a valley in the spectrum is artificially created between the peaks of the two formants, minimizing the amount of inverse filtering in the region between the two formants.

Detailed Description

First, the short term speech spectrum of the speech frame is normalized, with a mean equal to zero dB. Then, a battery of tests is performed to detect the presence of two close low-frequency formants. If we determine the following parameters, $\sigma_1$: The relative magnitude of the first estimated formant,
$\sigma_2$: The relative magnitude of the second estimated formant,
$\lambda_1$: Index in the frequency axis (1 ... 128) of the first estimated formant,
$\lambda_2$: Index in the frequency axis (1 ... 128) of the second estimated formant, a flag signaling the presence of two close low-frequency formants is raised if the following conditions are met:

$$\sigma_1 \geq \tau_1, \sigma_2 \geq \tau_2 \text{ and } (\sigma_1-\sigma_2) \leq \tau, \quad 1.$$

$$\lambda_1 \geq \lambda_{min} \text{ and } \lambda_1 \leq \lambda_{max}, \quad 2.$$

$$(\lambda_2-\lambda_1) \geq \delta_{min} \text{ and } (\lambda_2-\lambda_1) \leq \delta_{max}. \quad 3.$$

In applicant's preferred embodiment, the values of the parameters are set to be $\tau_1=3.25$ dB, $\tau_2=3.00$ dB, $\tau=1.25$ dB, $\lambda_{min}=12$, $\lambda_{max}=20$, $\delta_{min}=8$ and $\delta_{max}=16$.

Validation Experiments

Illustration of Functioning

Noise-adaptive Spectrum Extraction (NASE)

Figure 5:
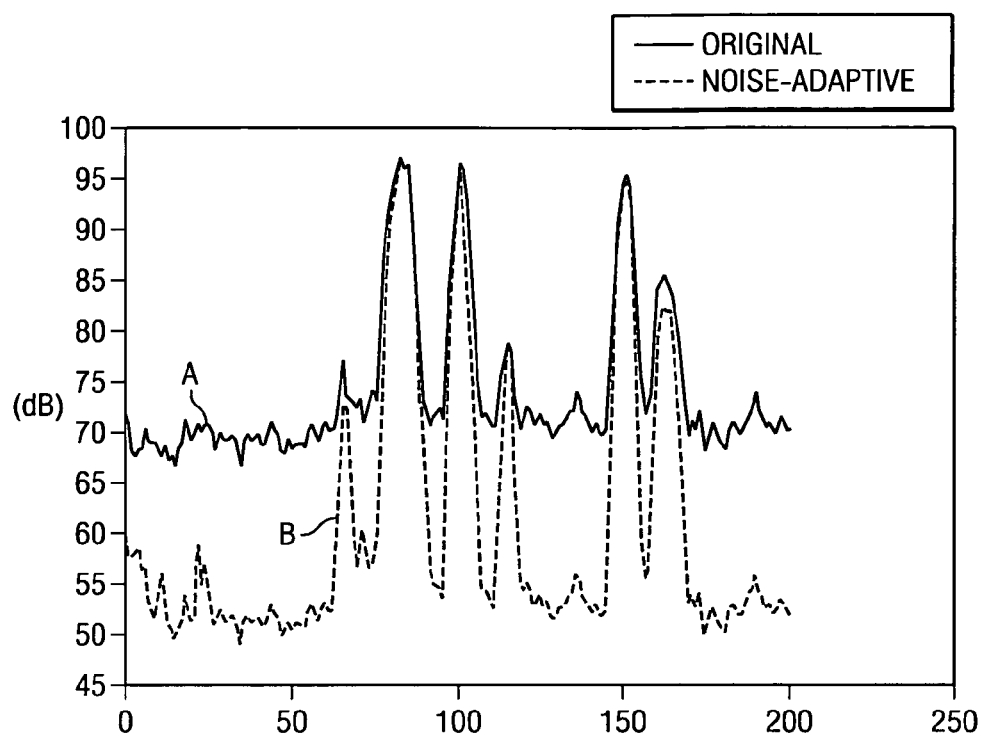
FIG. 5 is a plot of dB versus speech frame that illustrates speech/non-speech decision parameter before (original, curve A) and after (Noise-adaptive, curve B) noise adaptive process.

To illustrate the effectiveness of the noise-adaptive processing, the utterance "695-6250" was processed and the result is plotted in FIG. 5. It clearly indicates that the noise-adaptive spectrum extraction substantially lowers the noise background. Curve A with the solid line is the original and Curve B with the dashed lines is with noise-adaptive spectrum extraction. It indicates that the noise-adaptive spectrum extraction has no impact on peak values in that it leaves speech signal intact. Typically, an 18 dB improvement is achieved.

Spectral Inverse Filtering

Figure 6:
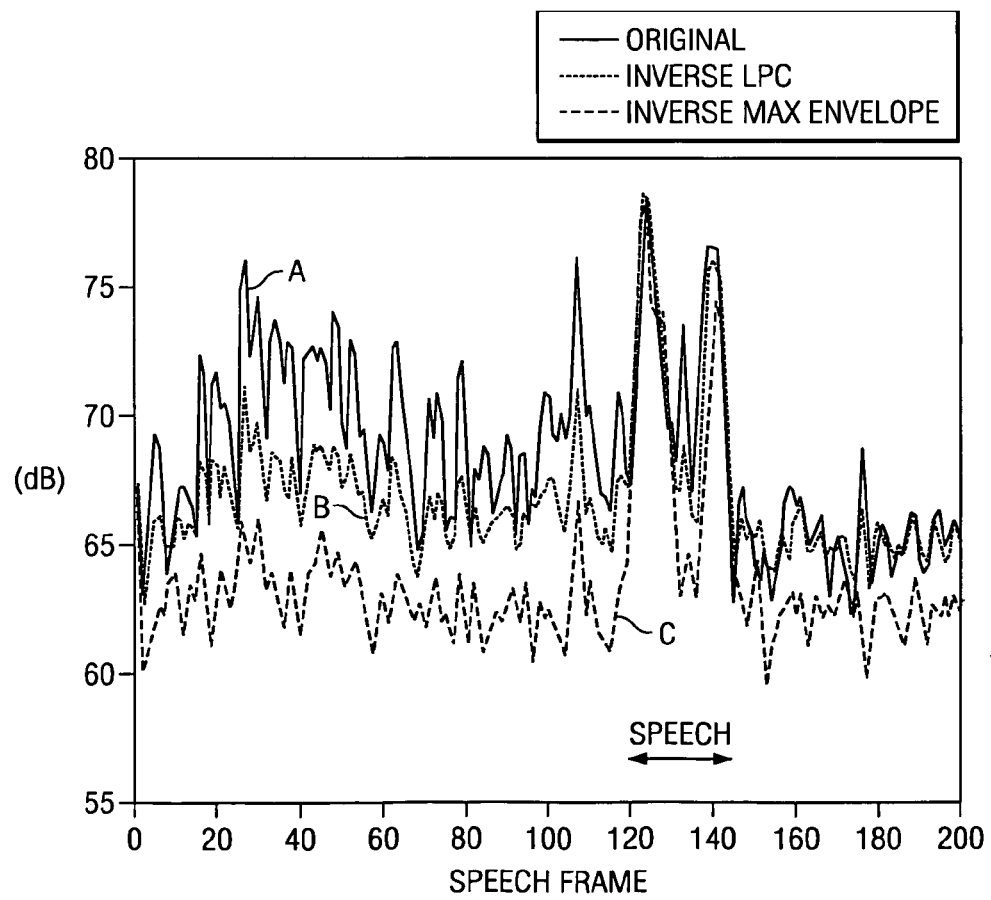
FIG. 6 is a plot of dB versus speech frame that illustrates speech/non-speech decision parameter before (original, curve A) and after (Inverse MAX filtering, curve B) inverse filtering.

To illustrate the effectiveness of the inverse filtering technique, the utterance "Taylor Dean" was processed and the normalized autocorrelation results are plotted in dB in FIG. 6 for three scenarios: 1) unfiltered speech (original, curve A with solid line), 2) with classic LPC inverse filtering (curve B with dotted line), and 3) with inverse filtering using the proposed technique of inverting the vocal tract filter using envelope determined using the maxima of the spectrum (curve C with dashed line). It clearly indicates the following:

Inverse filtering significantly increases the autocorrelation of the voiced part of the signal. After normalization of the plot, this results in lowering the auto correlation of the noisy parts of the signal. Performing inverse filtering using the envelope determined by the well-chosen spectrum maxima does not degrade performance of the system. In the example given, it even enhances performance of the inverse of the inverse filtering. While it is visually almost impossible to discern the speech signal (between frames 120 and 140) using the original curve, the inverse filtering allows for an immediate distinction.

Spectral Shaping

Spectral reshaping only manifests itself in frames for which the detector signaled the presence of two close low frequency formants and while a visual inspection might not immediately show the advantage of spectral reshaping. Results presented in the following paragraph and Table 1 illustrates the additional gain that can be obtained by using the technique.

Utterance Detection Assessment

To evaluate the performance improvement due to the three methods, a speech database was collected in automobile environments. The signal was recorded using a hands-free microphone mounted on the visor. Five vehicles were used for recording, representing several automobile categories.

TABLE 1

| Car | W/o preprocessing | W/NASE | W/NASE& INVFILT | W/NASE& INVFILT& SHAPING |
|---|---|---|---|---|
| ACCORD | 34.96 | 3.91 | 1.07 | 1.02 |
| B2300 | 33.40 | 3.19 | 0.76 | 0.45 |
| CRV | 26.91 | 2.67 | 1.45 | 1.07 |
| Sentra | 31.13 | 4.63 | 1.81 | 1.67 |
| Venture | 35.88 | 4.01 | 2.27 | 1.71 |
| Average | 32.46 | 3.68 | 1.47 | 1.18 |

Table 1 summarizes the test results. On average the first method reduces the detection errors by about an order of magnitude. The other two methods further reduce the remaining error by more than 50 percent.

The amount of additional reduction in the detection errors offered by the inverse filtering technique over the noise adaptive spectral extraction clearly illustrates the complementary of both techniques. While NASE helps minimizing the autocorrelation of the background noise by removing it, it does not help finding the voicing information within the speech signal. The inverse filtering technique, however, is able to extract the periodic voicing information from the speech signal, while it is insufficient to remove autocorrelation created by the background noise. In terms of noise characteristics, it can be stated the NASE will operate efficiently on slowly time-varying noises with broad spectra (almost white), while inverse filtering is able to remove noises with sharp spectral characteristics (almost tones).

It should be pointed out that the remaining 1 percent of detection error can often be attributed to an external cause over which the endpoint detector has little control, such as paper friction or speaker aspiration.

While the invention has been particularly shown and described with reference to a preferred embodiment, it will be understood by those skilled in the art that various changes in form and detail may be made without departing from the spirit and scope of the invention.

The invention claimed is:

1. A method of detecting speech in an incoming signal comprising the steps of:
   receiving said incoming signal, extracting an estimate of the noise background of the incoming signal and suppressing the noise background of the incoming signal to provide a noise suppressed signal in which the estimated background noise has been removed, filtering the noise suppressed signal in which the background noise has been removed with a spectral inverse filter, said spectral inverse filter is determined by spectrum maxima and the inverse filtering operation comprising the steps of:

in the logarithmic (dB) domain, removing the mean spectral magnitude from the original speech spectrum, in the mean removed short term frequency spectrum S(i), (i=1...128), determining all the frequency position (Pj), whose magnitudes are maxima over a window centered around Pj and stretching N positions to the left and right of Pj, in the list of peaks, adding the first (i=1) and last (i=128) frequency positions, their associated magnitudes set equal to the mean of the first and last M×N magnitudes, respectively, wherein said M and N are preset constants, removing the mean of the peak magnitudes from each peak magnitude, if the largest resulting peak magnitude exceeds a predetermined maximum peak value MAX_dB_DN, normalizing all peaks so that the largest peaks magnitude becomes MAX_dB_DN, and the resulting inverse filtering H(i) (i=1...128) is defined as the maximum of the normalized peaks and 0 dB, and removing the inverse filter from the original spectrum in the logarithmic domain U(i)=S(i)−H(i) and measuring the periodicity of the signal from the inverse filter using an autocorrelation function to determine whether a signal frame corresponds to a speech frame or not.

2. The method of claim 1 wherein said periodicity measurement is defined as:

$$\rho = \max_{T_l}^{T_h} Rx^{(\tau)}$$

where $T_l$ and $T_h$ are pre-specified so that the period will range in the range of speech and the signal is speech if ρ is above a given threshold.

3. The method of claim 2 wherein said period is between about 75 Hz and 400 Hz.

4. The method of claim 2 where said threshold value is set to maximize speech detection accuracy.

5. The method of claim 1 wherein said extracting step includes the steps of:
converting the spectrum of the incoming signal into logarithmic domain,
removing high frequency components in logarithmic domain by recurrent filtering along the time axis,
establishing an estimate of noise background,
converting the estimate into linear domain, and
suppressing the noise background from the signal, in linear domain.

6. The method of claim 1 wherein said M, N and MAX dB_DN are pre-selected to have the following values: M=5, N=3 and MAX_dB_DN=3.5 dB.

7. A noise-resistant utterance detector comprising the steps of:
accepting a speech utterance input signal,
removing background noise from the utterance signal according to a spectral subtraction method to get a noise subtracted signal,
inverse filtering the noise subtracted signal with a spectral inverse filter to get an inverse filtered signal,
calculating the autocorrelation from the inverse filtered signal to get an autocorrelation result, and
detecting that a frame of the signal being processed is or is not speech based on a threshold applied to the autocorrelation result,
wherein said spectral inverse filter is determined by the steps of:
in the logarithmic (dB) domain, removing the mean spectral magnitude from the original speech spectrum,
in the mean removed short term frequency spectrum S(i), i=...128), determining all the frequency position (Pj), whose magnitudes are maxima over a window centered around Pj and stretching N positions to the left and right of Pj,
in the list of peaks, adding the first (i=1) and last (i=128) frequency positions, their associated magnitudes set equal to the mean of the first and last M×N magnitudes, respectively, wherein said M and N are preset constants,
removing the mean of the peak magnitudes from each peak magnitude, and
if the largest resulting peak magnitude exceeds a predetermined maximum peak value MAX_dB_DN, normalizing all peaks so that the largest peaks magnitude becomes MAX_dB_DN,
wherein the resulting inverse filter H(i), (i=1...128) is defined as the maximum of the normalized peaks and 0 dB.

8. The noise-resistant utterance detector of claim 7 wherein said M, N and MAX_dB_DN are pre-selected to have the following values: M=5, N=3 and MAX_dB_DN=3.5 dB.

9. The noise-resistant utterance detector of claim 7 further comprising locating close low-frequency formants in the noise subtracted signal if they exist and inserting spectral valleys between said formants before said inverse filtering.

10. A method of determining if a signal includes speech, comprising:
accepting an input signal;
removing background noise from said input signal according to a spectral subtraction method to obtain a noise subtracted signal;
inverse filtering said noise subtracted signal with a spectral inverse filter to obtain an inverse filtered signal;
calculating the autocorrelation from said inverse filtered signal to get an autocorrelation result; and
detecting that a frame of said input signal is or is not speech based on a threshold applied to said autocorrelation result,
wherein said spectral inverse filter is determined by the steps of:
in the logarithmic (dB) domain, removing the mean spectral magnitude from the original speech spectrum,
in the mean removed short term frequency spectrum S(i), (i=1...128), determining all the frequency position (Pj), whose magnitudes are maxima over a window centered around Pj and stretching N positions to the left and right of Pj,
in the list of peaks, adding the first (i=1) and last (i=128) frequency positions, their associated magnitudes set equal to the mean of the first and last M×N magnitudes, respectively, wherein said M and N are preset constants,
removing the mean of the peak magnitudes from each peak magnitude, and
if the largest resulting peak magnitude exceeds a predetermined maximum peak value MAX dB DN, normalizing all peaks so that the largest peaks magnitude becomes MAX dB DN,
wherein the resulting inverse filter H(i), (i=1...128) is defined as the maximum of the normalized peaks and 0 dB.

11. The method of claim 10 wherein said M, N and MAX dB_DN are pre-selected to have the following values: M=5, N=3 and MAX_dB_DN=3.5 dB.

12. The method of claim 10 further comprising locating close low-frequency formants in the noise subtracted signal if they exist and inserting spectral valleys between said formants before said inverse filtering.

* * * * *